(12) United States Patent
Takahashi et al.

(10) Patent No.: US 7,079,736 B2
(45) Date of Patent: Jul. 18, 2006

(54) OPTICAL FIBER FOR WDM SYSTEM AND MANUFACTURING METHOD THEREOF

(75) Inventors: Fumio Takahashi, Chiyoda-ku (JP);
Hideya Moridaira, Chiyoda-ku (JP);
Masahide Kuwabara, Chiyoda-ku (JP);
Yoshinori Ishida, Chiyoda-ku (JP);
Satoru Ise, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 203 days.

(21) Appl. No.: 10/608,031

(22) Filed: Jun. 30, 2003

(65) Prior Publication Data

US 2004/0136668 A1    Jul. 15, 2004

Related U.S. Application Data

(60) Provisional application No. 60/399,185, filed on Jul. 30, 2002, provisional application No. 60/391,951, filed on Jun. 28, 2002.

(30) Foreign Application Priority Data

| Jul. 9, 2002 | (JP) | 2002-200422 |
| Aug. 30, 2002 | (JP) | 2002-253391 |
| Sep. 12, 2002 | (JP) | 2002-266306 |
| Sep. 13, 2002 | (JP) | 2002-268598 |
| Oct. 9, 2002 | (JP) | 2002-296568 |

(51) Int. Cl.
*G02B 6/02* (2006.01)

(52) U.S. Cl. .................. 385/123; 398/81; 398/148

(58) Field of Classification Search ........ 385/123–128; 398/29, 81, 148
See application file for complete search history.

(56) References Cited

U.S. PATENT DOCUMENTS

| 2,238,671 A | 4/1941 | Woodhouse ............ 166/21 |
| 3,784,585 A | 1/1974 | Schmitt et al. ............ 260/861 |
| 3,828,854 A | 8/1974 | Templeton et al. ......... 166/307 |
| 3,868,998 A | 3/1975 | Lybarger et al. ............ 166/278 |
| 4,169,798 A | 10/1979 | DeMartino ............ 252/8.55 R |
| 4,470,915 A | 9/1984 | Conway ................. 252/8.55 R |
| 4,716,964 A | 1/1988 | Erbstoesser et al. ........ 166/284 |
| 4,809,783 A | 3/1989 | Hollenbeck et al. ........ 166/307 |
| 4,843,118 A | 6/1989 | Lai et al. .................... 524/555 |
| 4,961,466 A | 10/1990 | Himes et al. ................ 166/250 |
| 4,986,354 A | 1/1991 | Cantu et al. ................ 166/279 |
| 5,082,056 A | 1/1992 | Tackett, Jr. ................. 166/295 |
| 5,439,055 A | 8/1995 | Card et al. .................. 166/280 |
| 5,460,226 A | 10/1995 | Lawson et al. ............. 166/300 |
| 5,591,700 A | 1/1997 | Harris et al. ................ 507/204 |

(Continued)

FOREIGN PATENT DOCUMENTS

WO    WO 04/037946 A1    5/2004

(Continued)

*Primary Examiner*—John D. Lee
*Assistant Examiner*—James D. Stein
(74) *Attorney, Agent, or Firm*—Oblon, Spivak, McClelland, Maier & Neustadt, P.C.

(57) ABSTRACT

An optical fiber having a length of one kilometer or more with average transmission loss at a wavelength of 1383 nm being less than average transmission loss at a wavelength of 1310 nm, wherein a maximum value of a transmission loss at the wavelength of 1383 nm of any one kilometer section along the entire length of the optical fiber does not exceed the average transmission loss at the wavelength of 1383 nm along the entire length of the optical fiber by 0.03 dB/km or more.

10 Claims, 10 Drawing Sheets

U.S. PATENT DOCUMENTS

| | | | |
|---|---|---|---|
| 6,162,766 A | 12/2000 | Muir et al. | 507/267 |
| 6,189,615 B1 | 2/2001 | Sydansk | 166/270 |
| 6,242,390 B1 | 6/2001 | Mitchell et al. | 507/211 |
| 6,387,986 B1 | 5/2002 | Moradi-Araghi et al. | 523/211 |
| 6,466,721 B1* | 10/2002 | Tsukitani et al. | 385/127 |
| 6,470,126 B1* | 10/2002 | Mukasa | 385/123 |
| 6,591,048 B1* | 7/2003 | Mukasa | 385/123 |
| 6,599,863 B1 | 7/2003 | Palmer et al. | 507/219 |
| 6,669,771 B1 | 12/2003 | Tokiwa et al. | 106/162 |
| 6,710,019 B1 | 3/2004 | Sawdon et al. | 507/136 |
| 6,853,784 B1* | 2/2005 | Shimizu et al. | 385/123 |
| 2001/0016562 A1 | 8/2001 | Muir et al. | 507/201 |
| 2003/0060374 A1 | 3/2003 | Cooke, Jr. | 507/200 |
| 2003/0086667 A1* | 5/2003 | Berkey et al. | 385/123 |
| 2003/0114314 A1 | 6/2003 | Ballard et al. | 507/100 |
| 2003/0130133 A1 | 7/2003 | Vallmer | 507/100 |
| 2003/0234103 A1 | 12/2003 | Lee et al. | 166/293 |
| 2004/0014607 A1 | 1/2004 | Sinclair et al. | 507/200 |
| 2004/0040706 A1 | 3/2004 | Hossaini et al. | 166/278 |

FOREIGN PATENT DOCUMENTS

| | | | |
|---|---|---|---|
| WO | WO 04/038176 A1 | 5/2004 | |

* cited by examiner

OPTICAL FIBER FOR WDM SYSTEM AND MANUFACTURING METHOD THEREOF

BACKGROUND OF THE INVENTION

1. Field of the Invention

The present invention relates to an optical fiber used for wavelength-division multiplexing (WDM) optical transmission, or more particularly, to a metropolitan system optical fiber and manufacturing method thereof.

2. Description of the Related Art

Conventionally, a technology for increasing a transmission capacity in optical transmission using an optical fiber has been pursued actively.

A transmission loss of an optical fiber generally reaches a minimum at a wavelength of approximately 1550 nm, and therefore it is desirable to use this wavelength band for optical transmission and a dispersion shifted optical fiber (DSF) having a zero dispersion wavelength around a wavelength of 1550 nm has been developed. This optical fiber allows optical transmission with a transmission capacity of several Gbps in a wavelength band of 1.55 µm.

Furthermore, quite vigorous research and development on wavelength-division multiplexing (WDM) optical transmission is being carried out as the technology for increasing a transmission capacity in recent years. Moreover, many investigations are also being carried out on an optical fiber preferably used for WDM optical transmission.

When an optical fiber is used for WDM optical transmission, it is required from the standpoint of preventing a four-wave mixing that no zero dispersion wavelength should exist in the wavelength band used, and therefore a non-zero dispersion shifted optical fiber (NZDSF) with no zero dispersion included in the wavelength band used has been developed. Through the development of this NZDSF, WDM transmission has become feasible in a wavelength range of 1530 to 1565 nm (C band) and a wavelength range of 1565 nm to 1625 nm (L band), which has increased a transmission capacity drastically.

In order to increase the transmission capacity in such a WDM optical transmission system, an attempt is made to expand a wavelength bandwidth of transmission signals.

The invention disclosed in U.S. Pat. No. 6,205,268 maintains substantially the same fiber parameters as those of a standard single mode optical fiber as shown in a loss curve 132 and dispersion curve 131 in FIG. 13, reduces a loss peak (133 in FIG. 13) by OH absorption of 1383 nm, reduces a dispersion value of a wavelength band of 1.4 µm and thereby realizes a CWDM (Coarse Wavelength Division Multiplexing) system in a wide wavelength range of wavelength bands of 1.3 µm, 1.4 µm and 1.5 µm. In this CWDM transmission system, the optical fiber has a zero dispersion wavelength in the vicinity of 1310 nm (dispersion curve 131), and therefore transmission using the wavelength band of 1.3 µm for analog CATV transmission and the wavelength band of 1.4 µm for transmission at 10 Gbps or above is proposed. Furthermore, with the proposal of this new CWDM transmission system, a transmission apparatus for transmission in the wavelength band of 1.4 µm has also been developed in recent years and being put to practical use.

With consideration given to the application of WDM transmission to a metropolitan system, given the fact that an overwhelming majority of transmission paths running today are standard single mode fibers, the proposal of above described U.S. Pat. No. 6,205,268 seems excellent. However, given the fact that an overwhelming majority of transmission apparatuses already put to practical use are also transmission apparatuses for the wavelength band of 1.3 µm, it is desirable to use not only the wavelength band of 1.4 µm but also the wavelength band of 1.3 µm for WDM transmission from the standpoints of cost as well as consistency with the actual system.

On the other hand, as the invention disclosed in U.S. Pat. No. 5,905,838, there is a proposal on an optical fiber which shifts the zero-dispersion wavelength to 1350 to 1450 nm as shown in the dispersion curve 134 in FIG. 13 and sets an absolute value of dispersion of 1310 nm and 1550 nm to 1.0 to 8.0 ps/nm/km to thereby realize WDM transmission using both wavelength bands. However, attempting to realize WDM transmission using both wavelength bands results in an unavoidable reduction of the mode field diameter MFD (or effective core area Aeff) as described in the aforementioned US Patent. The above described US Patent regards 49 µm$^2$ as an upper limit of Aeff.

Furthermore, U.S. Pat. No. 6,131,415 sets a cladding/core ratio of a core rod to 2.0 to 7.5 to prevent OH groups in an over cladding from spreading into the core during drawing and realize a low OH fiber. However, it is generally known that an absorption peak by OH groups increases after a hydrogen aging test specified by IEC60793-2-50 (first edition 2002-01) Annex C Section C 3.1 is conducted.

Especially when use in a metropolitan system is considered, the following conditions are further required: (1) Many standard single mode optical fibers are already laid and compatibility with these established optical fibers is important. For this reason, it is desirable to make a compatible design with the standard single mode optical fibers, regarding optical fiber parameters such as MFD, cladding diameter, specific refractive index difference and transmission characteristics such as optical transmission loss, dispersion, cutoff wavelength and mechanical characteristics against bending and lateral pressure etc. (2) Optical fibers are generally formed into a cable and laid in underground conduits. In the case of a metropolitan system, conduits are tangled in a complicated manner and it is difficult to lay the optical cables in long lengths. For this reason, an average length of a cable piece is about 1 km. On the other hand, optical fibers are shipped in piece lengths of 25 to 50 km. Normally, an absorption loss characteristic of 1383 nm by OH groups does not change by cabling, and therefore uniformity in the longitudinal direction of the transmission characteristic of an optical fiber is an important factor to secure the quality of the cable.

In the case of a metropolitan system, multi-core cables having 1000 cores are put to practical use and it is more important for the optical fiber to have excellent uniformity in the characteristic (transmission loss) of approximately 1 km, small loss in connections between fibers, micro bending loss and resistance to lateral pressures, etc., rather than an average transmission loss in long length of 25 to 50 km. From such a standpoint, in above described U.S. Pat. No. 5,905,838, it does not disclose transmission characteristics in short length of the optical fiber and the MFD (Aeff) is as small as approximately 7 µm, and therefore connection loss in a connection with a standard single mode optical fiber having an MFD of approximately 9.2 µm becomes 0.3 dB or above, which is not practical. In this way, attempting to be compatible with existing transmission paths results in not being compatible in terms of transmission apparatuses, and on the contrary attempting to be compatible with existing transmission apparatuses results in not being compatible in terms of transmission paths. Any attempt to optimize this compatibility from both aspects of transmission paths and transmission apparatuses has not been made so far.

SUMMARY OF THE INVENTION

The present invention has been implemented taking into account the uniformity of transmission loss for longitudinal direction (i.e., longitudinal uniformity) in 1383 nm of a short fiber of approximately 1 km long and mainly compatibility with existing optical fibers as a metropolitan optical fiber.

The present inventors noticed the longitudinal uniformity in transmission loss at a wavelength of 1383 nm which is an absorption peak of OH groups and investigated into the longitudinal uniformity of transmission loss at this wavelength of 1383 nm by using the developed measurement technology, and as a result discovered the following points:

For example, though an optical fiber of 25.2 km length band and average transmission loss at a wavelength of 1383 nm of 0.32 dB/km with substantially no absorption peak of OH groups, a measurement result of section loss for every 1 km were measured with a large variation of 0.28 to 0.38 dB/km (see FIG. 3). When longitudinal uniformity of transmission loss of this optical fiber at wavelength of 1310 nm and wavelength of 1550 nm was measured, with regard to section loss for every 1 km, the variation width from an average transmission loss fell within a range of 0.03 dB/km. For this reason, it has been discovered that while the conventional optical fiber could guarantee transmission loss in a short length of optical fiber at a wavelength of 1310 nm or 1550 nm, it could not necessarily guarantee transmission loss in a short length of optical fiber at a wavelength of 1383 nm.

It has also been discovered that as with an Aeff expansion type NZDSF and a dispersion slope reduction type NZDSF, a longitudinal variation of transmission loss of this wavelength band of 1383 nm tends to increase in size as a profile of the optical fiber becomes more complicated.

One aspect of the present invention is to provide an optical fiber with a reduced variation in the longitudinal direction of transmission loss at the above described wavelength of 1383 nm. The optical fiber according to the present invention is an optical fiber having a length of 1 km or more with an average transmission loss at a wavelength of 1383 nm being less than an average transmission loss in a wavelength of 1310 nm, characterized in that a maximum value of section loss of any 1 km at a wavelength of 1383 nm does not exceed the average transmission loss by 0.03 dB/km or more. The maximum value of any section loss of any 1 km at the wavelength of 1383 nm preferably does not exceed the average transmission loss by 0.01 dB/km or more.

Furthermore, the optical fiber according to the present invention is characterized in that the cutoff wavelength at a length of 22 m is less than 1380 nm.

Furthermore, the optical fiber according to the present invention is characterized in that the average transmission loss at a wavelength of 1383 nm is less than an average transmission loss at the wavelength of 1310 nm after a hydrogen aging.

According to the optical fiber of the present invention, the average transmission loss at the wavelength of 1383 nm is less than the average transmission loss at the wavelength of 1310 nm and the maximum value of any 1 km section loss does not exceed the average transmission loss by 0.03 dB/km or more, and therefore it can be used at a wavelength band of 1.38 μm and transmission loss can be guaranteed even for a short length of cable.

Furthermore, since the cutoff length at a length of 22 m is shorter than 1380 nm, single mode transmission at a wavelength of 1383 nm is possible.

Furthermore, since the average transmission loss at the wavelength of 1383 nm is less than the average transmission loss at a wavelength of 1310 nm after a hydrogen aging, stable transmission in a wavelength band of 1.38 μm for a long period of time can be guaranteed.

In the present specification, average transmission loss (dB/km) is defined as a value obtained by dividing a transmission loss (dB) along the entire length of an optical fiber (that is, length not including splicing point for example, one turn length) by the continuous length (km). Furthermore, any 1 km section (dB/km) loss is defined as a transmission loss at any 1 km section in the longitudinal direction. Furthermore, a hydrogen aging test refers to a method specified by IEC60793-2-50 (first edition 2002-01) C 3.1. Suppose λy in the present invention is 1383 nm. Furthermore, a cable cutoff wavelength at a length of 22 m refers to a cable cutoff wavelength λcc defined in ITU-T G.650. Other terms not defined in this specification will follow definitions and measuring methods according to ITU-T G.650.

A second aspect of the present invention is to provide an optical fiber which is preferably applicable to DWDM transmission in a wavelength band of 1.3 μm that is compatible with existing transmission paths (standard single mode fiber).

The optical fiber of the present invention is characterized by having an MFD of 8 μm or more at a wavelength of 1310 nm, a zero dispersion wavelength out of a wavelength range of 1280 to 1324 nm, a dispersion absolute value in the wavelength range of 0.1 to 8.0 ps/nm/km, a dispersion slope of 0.1 ps/nm$^2$/km or less, a cable cutoff wavelength at a length of 22 m of 1270 nm or less and average transmission loss of 0.4 dB/km or less at a wavelength of 1310 nm. Here, a wavelength band of 1.3 μm is defined as a range of wavelength of 1280 nm to 1324 nm.

Since the MFD at 1310 nm is 8 μm or above, it is possible to reduce a splicing loss with a standard single mode optical fiber having MFD of approximately 9.2 μm to 0.1 dB or below and maintain compatibility with existing transmission paths.

Furthermore, since there is zero dispersion wavelength out of at a wavelength range of 1280 to 1324 nm and a dispersion in the wavelength range is 0.1 to 8.0 μs/nm/km, it is possible to practically ignore waveform distortion due to a nonlinear phenomenon such as a four-wave mixing, etc. Since the absolute value of the dispersion slope is 0.1 μs/nm$^2$/km or less, the difference in the wavelength dispersion value between signal lights is reduced and optical transmission which effectively reduces the difference in the amount of waveform distortion by wavelength dispersion between signal lights becomes feasible.

Since the cutoff wavelength at a length of 22 m is 1270 nm or less, only a fundamental mode light can propagate in a wavelength band of 1.3 μm. Since the average transmission loss at a wavelength of 1310 nm is 0.4 dB/km or less, an optical communication in a wavelength band of 1.3 μm is possible.

Furthermore, when the MFD at 1310 nm is 9.5 μm or less or when the zero dispersion wavelength is 1325 to 1350 nm, the optical fiber of the present invention can be realized by only adding a minimum change to the profile of the standard single mode optical fiber, making it possible to realize an optical fiber with excellent manufacturability.

Furthermore, with the optical fiber of the present invention, when an MFD at 1310 nm is A (μm) and a cable cutoff wavelength at a length of 22 m is B (nm), it is possible to realize the above described characteristic by satisfying a relationship of A×B≦11*1000.

Furthermore, when the optical fiber of the present invention has the average transmission loss at a wavelength of 1383 nm that is less than the average transmission loss at a wavelength of 1310 nm, the absolute value of dispersion of 0.1 to 8.0 ps/nm/km and the dispersion slope of 0.1 ps/nm²/km or less, it is possible to utilize a wavelength band of 1.4 µm for future expansion of the wavelength range, which is therefore preferable.

Since an increase in average transmission loss at a wavelength of 1383 nm is 0.04 dB/km or less after hydrogen aging, it is possible to provide an optical fiber with excellent long-term reliability accompanied by hydrogen resistance.

A third aspect of the present invention is intended to provide a fiber which has only a small increase of an absorption peak by OH groups at 1383 nm even if a hydrogen aging test is conducted, that is, a fiber with excellent hydrogen resistance and consistent with existing optical fibers as a metropolitan fiber. It is especially intended to provide a method of manufacturing an optical fiber preferably applicable to a WDM transmission in a C band at low costs.

In order to attain the above described objects, the present invention provides a method of manufacturing an optical fiber having a mode field diameter of 8.0 to 11.0 µm at a wavelength of 1310 nm, average transmission loss at a wavelength of 1383 nm less than average transmission loss at a wavelength of 1310 nm and dispersion of +2 to +8 ps/nm/km at a wavelength of 1383 nm, characterized by drawing an optical fiber preform, coating the optical fiber and exposing the optical fiber to a vapor phase atmosphere containing a deuterium gas.

In the optical fiber provided with the above described characteristics, those characteristics are used for the following reasons:
(1) First, the MFD at a wavelength of 1310 nm is designed to be 8.0 to 11.0 µm and this is intended to secure compatibility when connected to an existing standard single mode optical fiber.
(2) The average transmission loss at the wavelength of 1383 nm is designed to be less than the average transmission loss at the wavelength of 1310 nm. Thus, an increase in transmission loss at the wavelength of 1383 nm is suppressed.
This is realized by applying a process which will be described later and thereby suppressing an increase in absorption loss by OH groups at the wavelength of 1383 nm.
(3) Dispersion in the wavelength range of wavelength of 1383 nm is designed to be +2 to +8 ps/nm/km. The optical fiber is preferably designed to have a dispersion of +4 to +7 ps/nm/km at the wavelength of 1383 nm.

This can suppress influences of a four-wave mixing and minimize influences of accumulated dispersion when an optical transmission path is constructed.

As long as the above described characteristics are satisfied for the optical fiber manufactured according to the present invention, the shape of a refractive index distribution profile is subject to no restrictions. For example, the refractive index profile applied to a low loss optical fiber shown in FIG. 1 can be used.

DETAILED DESCRIPTION OF THE PREFERRED EMBODIMENTS

Figure 1:
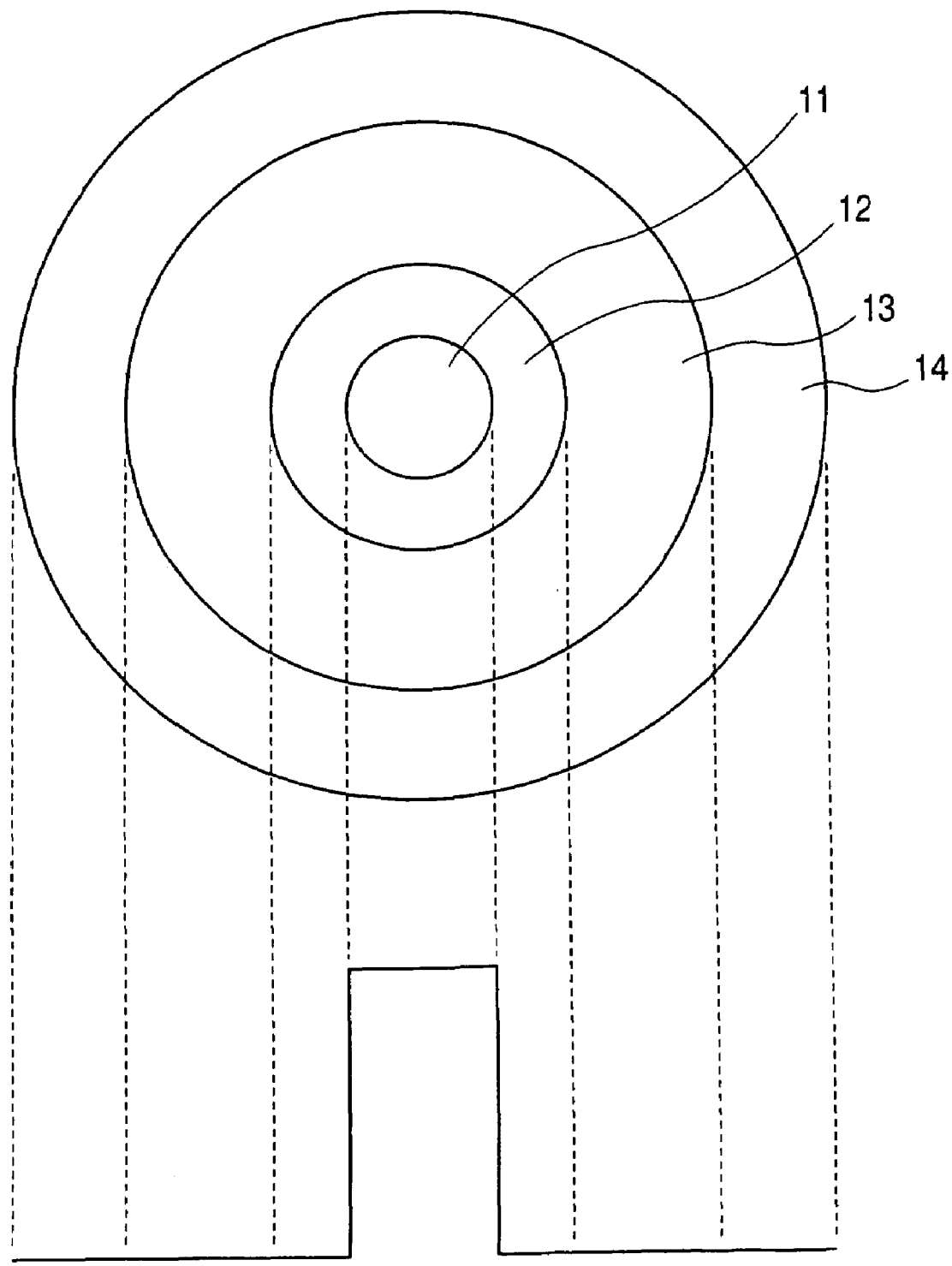
FIG. 1 illustrates a refractive index profile of an optical fiber in an embodiment according to a first aspect of the present invention.

With reference now to the attached drawings, a first aspect of an optical fiber of the present invention that reduces a transmission loss variation at a wavelength of 1383 nm and a method of manufacturing thereof will be explained below. FIG. 1 illustrates a refractive index profile of an optical fiber according to the present invention. Thereby as a result of investigations into the above described problem of the longitudinal variation of transmission loss at a wavelength of 1383 nm, the present inventors have discovered that micro variations in the core diameter and the amount of core eccentricity in the longitudinal direction at the stage of the optical fiber preform were the causes for the problem. OH groups in the over cladding generally spread toward the core during drawing and the area close to the over cladding has a higher concentration of OH group. The light propagation region near the area close to over cladding with a higher concentration of OH group extends more in an area where the mode field diameter is large than an area where the mode field diameter is small, and therefore the transmission loss at the wavelength of 1383 nm is liable to increase. Thus, a longitudinal variation of transmission loss at the wavelength of 1383 nm occurs according to the variation of the mode field diameter.

As described in U.S. Pat. No. 6,131,415, it is disclosed that increasing the cladding/core ratio in a core rod is effective in reducing an average transmission loss at the wavelength of 1383 nm. However, increasing the cladding/core ratio in the core rod causes a micro variation of the cladding/core ratio to lead to an increase of the MFD or the length of a variation in the amount of mode field eccentricity. To improve these contradictory characteristics, the following changes have been made in the design of a standard single mode optical fiber.

1) Using a VAD method, the cladding/core ratio when the core rod was manufactured was set to 2 or below. This managed to suppress influences of the variation in the cladding/core ratio on the longitudinal direction to 1 km or less.
2) In the elongation process, etc., an elongation was made using an electric furnace without using any oxy-hydrogen flame burner. Avoiding the use of the oxy-hydrogen flame burner which may cause OH allowed the concentration of OH groups of the entire glass to be reduced to 1 ppm or below.
3) As shown in FIG. 1, a range of a second cladding 13 obtained by vitrifying a porous soot body of a small bulk density was disposed at the midpoint position between the core rod (core 11 and first cladding 12) and the outermost third cladding 14. The ratio of diameter of the core 11 to the second cladding 13 was set to 6 to 8. The bulk density of the range of the second cladding 13 at the stage of the porous soot body is preferably 0.3 g/cm$^3$ or less. This also allowed the concentration of OH groups of the second cladding 13 to be reduced to 1 ppm or below.

The optical fiber preform obtained in this way was drawn into an optical fiber and the characteristics thereof were measured as follows. The following results were obtained, which indicate that the optical fiber is also applicable to a short length of optical cables.

Figure 2:
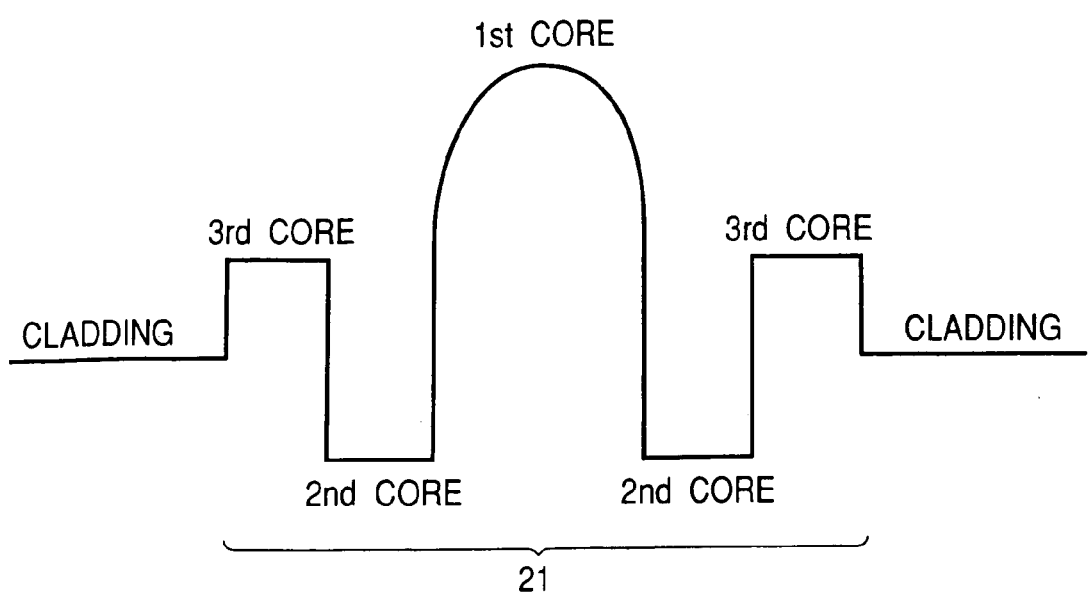
FIG. 2 illustrates a refractive index profile of multilayer cores of an optical fiber in another embodiment according to the first aspect of the present invention.
Figure 3:
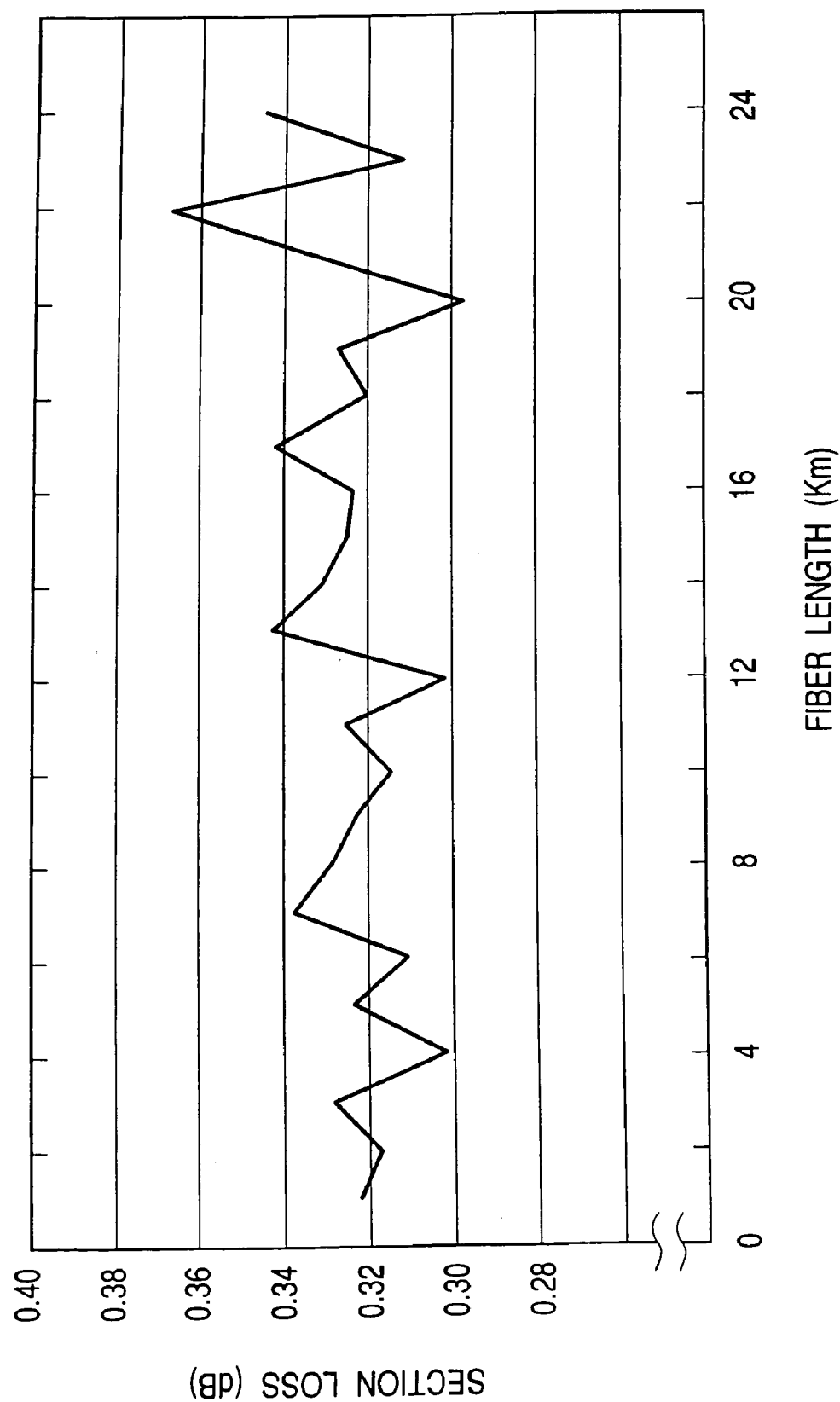
FIG. 3 illustrates a section loss variation for every 1 km of transmission loss at a wavelength of 1383 nm in a conventional optical fiber.

Transmission loss at 1310 nm: 0.34 dB/km
Transmission loss at 1550 nm: 0.20 dB/km
Transmission loss at 1383 nm: 0.31 dB/km
Maximum value of 1 km section loss:
  at 1310 nm: 0.36 dB/km
  at 1550 nm: 0.21 dB/km
  at 1383 nm: 0.32 dB/km
MFD:
  at 1310 nm: 9.2 µm
  at 1550 nm: 10.4 µm
  at 1383 nm: 9.6 µm This technique was applied to the profile in FIG. 2 and an effective area (Aeff) enlarged type of NZDSF and a dispersion slope reduced type of NZDSF were made as prototypes. That is, the refractive index profile 21 shown in FIG. 2 is a refractive index profile with multi layer cores corresponding to the core 11 shown in FIG. 1. Even in such a case with a multilayer core, the result showed that by providing the second cladding layer 13 shown in FIG. 1, the maximum value of any 1 km section loss at a wavelength of 1383 nm did not exceed the average transmission loss by 0.03 dB/km or more.

According to the optical fiber of the present invention, the average transmission loss at the wavelength of 1383 nm is less than the average transmission loss at a wavelength of 1310 nm and the maximum value of any 1 km section loss does not exceed the average transmission loss by 0.03 dB/km or more, and therefore the optical fiber can be used at a wavelength of 1383 nm and transmission loss can be guaranteed even in the case of a short length of optical cable. Furthermore, since the average transmission loss at the wavelength of 1383 nm after a hydrogen aging test is less than the average transmission loss at a wavelength of 1310 nm, it is possible to guarantee a stable transmission for a long period of time in the vicinity of approximately 1380 nm.

Then, for the compatibility of the present invention with existing fibers, an example of the optical fiber with an aspect with an MFD of 8 µm or more at 1310 µm will be explained with reference to FIG. 4 and FIG. 5.

The optical fiber according to the present invention has preferably the MFD at 1310 nm of 9.5 µm or less or the zero dispersion wavelength of 1325 to 1350 µm. The above described characteristic can be realized by satisfying a relationship of A×B≦11*1000 when the MFD at the wavelength of 1310 nm is A (µm) and the cutoff wavelength at a length of 22 meters is B (nm).

Furthermore, with the optical fiber according to the present invention, it is preferable that the average transmission loss at the wavelength of 1383 nm be less than the average transmission loss at the wavelength of 1310 nm and the absolute value of dispersion be 0.1 to 8.0 ps/nm/km and the dispersion slope be 0.1 ps/nm$^2$/km or below.

By reducing a transmission loss at the wavelength of 1383 nm after hydrogen aging to 0.04 dB/km or less, the present invention can provide an optical fiber with excellent long-term reliability, which is therefore preferable.

The optical fiber according to this embodiment comprises a core having a refractive index of n1 centered on the optical axis and a cladding having a refractive index of n2 around the core area. The relationship between those refractive indices is n1>n2. Such an optical fiber can be realized by doping Germanium to the silica core.

For the optical fiber, the soot produced by a VAD method was vitrified through dehydration, sintered to obtain a preform, then the preform was drawn and coated with two UV cure resin layers to obtain an optical fiber strand of 250 µm in outer diameter. Then, the optical fiber was exposed in a D$_2$ gas atmosphere at an ordinary temperature and under an ordinary pressure for approximately 2 hours and measured for the various characteristics shown below.

FIRST EXAMPLE

Figure 4:
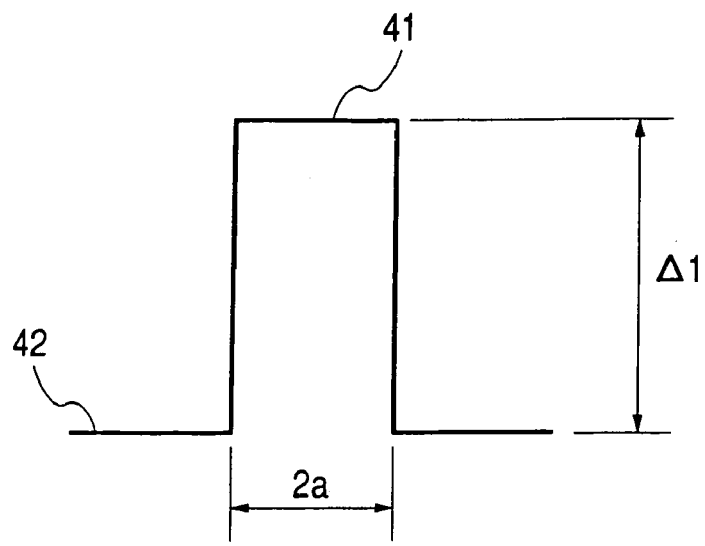
FIG. 4 illustrates a refractive index profile of an optical fiber in an embodiment according to a second aspect of the present invention.

The optical fiber according to First Example has the refractive index profile made up of a step type core refractive index 41 and a cladding refractive index 42 shown in FIG. 4, wherein the MFD at a wavelength of 1310 nm is 8.5 µm, the zero dispersion wavelength is 1326 nm, the dispersion slope in a wavelength range of 1280 nm to 1324 nm is 0.08 ps/nm$^2$/km, the absolute value of the dispersion value in the wavelength range is 0.4 to 3.4 ps/nm/km and the cutoff wavelength is 1250 nm. Therefore, A×B (product of MFD and cutoff wavelength) was 10625. The average transmission loss at the wavelength of 1310 nm was 0.34 dB/km and the average transmission loss at the wavelength of 1383 nm was 0.29 dB/km. Furthermore, after a hydrogen aging test was conducted on this fiber, the increase in transmission loss at the wavelength of 1383 nm was 0.00 dB/km.

SECOND EXAMPLE

The optical fiber of Second Example has the refractive index profile shown in FIG. 4, wherein the MFD at a wavelength of 1310 nm is 8.1 µm, the zero dispersion wavelength is 1340 nm, the dispersion slope in a wavelength band of 1.3 µm is 0.08 ps/nm$^2$/km, the absolute value of the dispersion value in the wavelength band of 1.3 µm is 1.6 to 5.2 ps/nm/km and the cutoff wavelength is 1100 nm. Therefore, A×B (product of MFD and cutoff wavelength) is 8910. The average transmission loss at the wavelength of 1310 nm was 0.34 dB/km and the average transmission loss at the wavelength of 1383 nm was 0.29 dB/km. Furthermore, after a hydrogen aging on this fiber, the increase in transmission loss at the wavelength of 1383 nm was 0.00 dB/km.

THIRD EXAMPLE

Figure 5:
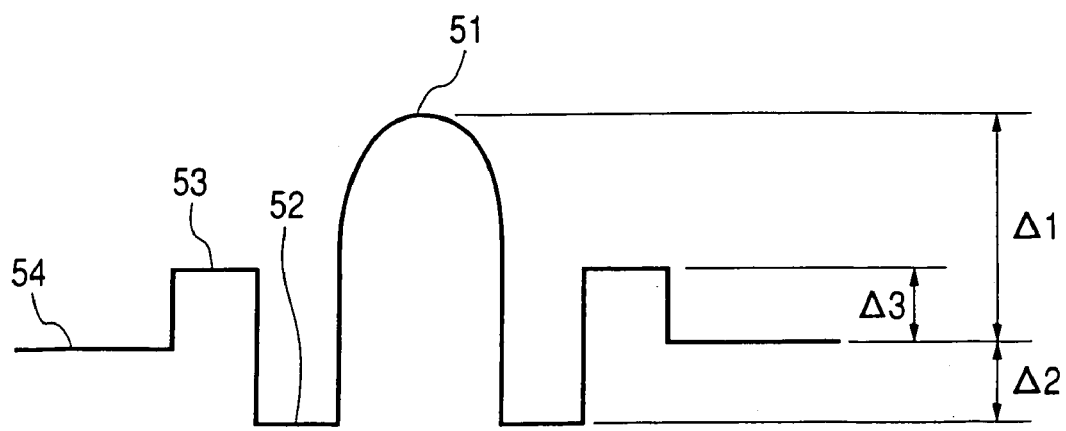
FIG. 5 illustrates a refractive index profile of an optical fiber in another embodiment according to the second aspect of the present invention.

The refractive index profile of the optical fiber according to the present invention is not limited to the one shown in FIG. 4, but, for example, the refractive index profile shown in FIG. 5 is also acceptable. This is a profile having a first core refractive index 51 with a peak at the center, a refractive index which is greater than a cladding refractive index 54 by Δ1, a second core refractive index 52 which is smaller by Δ2 and a third core refractive index 53 which is greater than the cladding by Δ3.

The fiber of the present invention can be compatible with existing transmission paths and provides a WDM optical fiber which suppresses generation of a four-wave mixing in a wavelength band of 1.3 μm.

Furthermore, when the MFD at a wavelength of 1310 nm is 9.5 μm or below or when the zero dispersion wavelength is 1325 to 1350 nm, the optical fiber of the present invention can realize an optical fiber with excellent manufacturability, which is therefore preferable.

Furthermore, having the average transmission loss at a wavelength of 1383 nm being less than the average transmission loss at a wavelength of 1310 nm, the absolute value of the dispersion of 0.1 to 8.0 ps/nm/km and the dispersion slope of 0.1 ps/nm$^2$/km or below, the optical fiber of the present invention can thereby utilize a wavelength band of 1.4 μm when the wavelength area used will be expanded in the future, which is therefore preferable.

When the increase in average transmission loss at the wavelength of 1383 nm after a hydrogen aging test is 0.04 dB/km or below, the present invention can provide an optical fiber with excellent long-term reliability, which is further preferable.

An example of implementation of a method of manufacturing a metropolitan optical fiber with excellent hydrogen resistance according to the third aspect of the present invention is as follows.

First, an optical fiber preform is manufactured using a conventional VAD method. Then, the optical fiber preform is drawn and an optical fiber having a predetermined diameter is manufactured and then the optical fiber is coated to be transformed into an optical fiber. Then, this optical fiber is processed to improve hydrogen resistance. More specifically, this optical fiber is accommodated in a processing apparatus and the inside of the apparatus is set in an atmosphere containing a deuterium ($D_2$) gas at an ordinary temperature and under an ordinary pressure and exposed for a predetermined time.

The deuterium component is charged into the optical fiber, infiltrates into defects in the optical fiber and forms coupling. As a result, when the processed optical fiber is subjected to a hydrogen aging test, hydrogen that has infiltrated into the optical fiber cannot couple with the above described defects which are already inactivated, and therefore no increase of any specific absorption peak occurs. That is, hydrogen resistance is improved.

It is preferable to set 10 to 40° C. as the ordinary temperature and 86 to 106 kPa as the ordinary pressure during the above described exposure processing. The processing time is dependent on the length of the optical fiber to be processed and 24 hours at longest.

By carrying out such processing, the present invention can provide an optical fiber having the above described characteristics, wherein the amount of increase in transmission loss at the wavelength of 1383 nm after a hydrogen aging test is 0.04 dB/km or less, preferably 0.01 dB/km or less.

Figure 6:
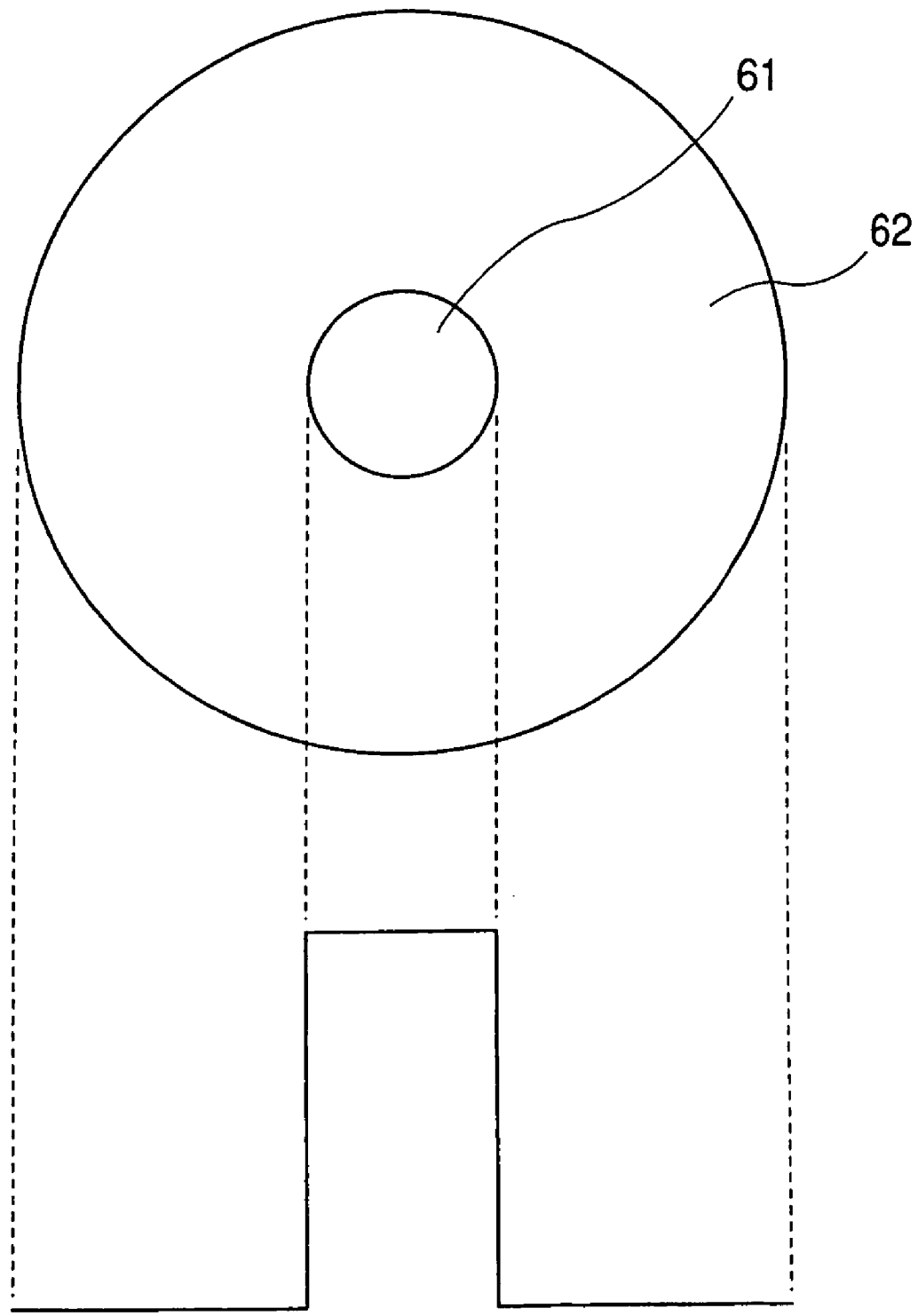
FIG. 6 illustrates a refractive index profile of an optical fiber in an embodiment according to a third aspect of the present invention.

A refractive index profile of the optical fiber manufactured in this way is shown in FIG. 6 and is of a step type with a core 61 having a higher refractive index than a cladding 62.

This optical fiber at a length of approximately 3 km long is placed in the processing apparatus, the inside of the apparatus is set in a substantially 100% deuterium atmosphere at a temperature of 23° C. and under a pressure of 100 kPa and left in that condition for approximately 3 hours.

The optical fiber after the processing was subjected to a hydrogen aging test specified in IEC60793-2-50 (first edition 2002-01) Annex C Section C 3.1 and the average transmission loss at the wavelength of 1383 nm was measured using the method specified by ITU-TG.650. This result is shown together with the measurement result before the hydrogen aging in Table 1. The average transmission loss at the wavelength of 1310 nm was also measured.

The MFD at the wavelength of 1310 nm and the dispersion value at the wavelength of 1383 nm were measured and their results are also shown in Table 1. For comparison, similar measurements are also performed on the optical fiber without deuterium exposure processing and the results are shown together as a comparative example.

TABLE 1

| | Refractive index distribution profile | Dispersion value (ps/nm/km) | MFD (μm) | Transmission loss at wavelength of 1310 nm (dB/km) | Transmission loss at wavelength of 1383 nm (dB/km) | |
|---|---|---|---|---|---|---|
| | | | | | Before hydrogen aging test | After hydrogen aging test |
| Example 1 | FIG. 6 | 5.8 | 9.26 | 0.33 | 0.31 | 0.31 |
| Example 2 | FIG. 6 | 4.5 | 9.38 | 0.32 | 0.29 | 0.29 |
| Comparative Example | FIG. 6 | 5.1 | 9.14 | 0.33 | 0.29 | 0.39 |

As is apparent from Table 1, in comparison with the comparative example with no deuterium processing, the optical fiber manufactured by the method of the present invention has no increase in average transmission loss at a wavelength of 1383 nm after the hydrogen aging test.

As is clear from the above explanation, the present invention can improve hydrogen resistance not in the intermediate process of the optical fiber but after final process in a state of the optical fiber which can already be actually used. Therefore, it is possible to manufacture an optical fiber with an increase in transmission loss at the wavelength of 1383 nm suppressed to 0.04 dB/km or below, having excellent hydrogen resistance and transmission loss which is stable for a long period of time by low cost.

Then, this optical fiber is designed in such a way that the MFD at a wavelength of 1310 nm is 8.0 to 11.0 µm, average transmission loss at a wavelength of 1383 nm is less than average transmission loss at a wavelength of 1310 nm and dispersion at a wavelength of 1383 nm becomes +2 to +8 ps/nm/km, and therefore the optical fiber is compatible with existing standard single mode optical fibers, and is useful for construction of an optical network. There is an expectation for its utility as the optical path used in a C band WDM transmission system.

Another problem is that there are some structural defects in an optical fiber after drawing. When this optical fiber is actually used, $H_2$ generated from the coating of the optical fiber and the like spread into the optical fiber, cross-react with the structural defects and generate OH groups.

Therefore, even if no OH group existed when the fiber was manufactured, new OH groups may be generated in the field, causing absorption loss in the optical fiber.

Such a problem with absorption loss by the OH groups and $H_2$ causes an increase in transmission loss when a long transmission path is constructed using optical fibers, and must be solved without fail.

Furthermore, Japanese Examined Patent Publication No. HEI4-4988 proposes an optical fiber which has moved the optical absorption wavelength toward the longer wavelength side than the wavelength band of 1550 nm by substituting residual OH groups in glass by OD groups (D: deuterium). However, the actual problem is that this method causes the residual OH groups to be substituted by the OD groups, which requires processing for a long time at a high temperature, which is not economical and lacks in practicality.

Furthermore, Japanese Published Patent Application No. 2000-187733 discloses the following method. This is the method that exposes the optical fiber after drawing to a deuterium ($D_2$) atmosphere prior to its actual use to generate OD groups in the structural defects and prior to generating OH groups with $H_2$ in the operating environment. This prevents cross-reaction between the structural defects of the optical fiber and $H_2$ in the operating environment and prevents new OH groups from being generated.

The development of this prior art allows optical absorption based on $H_2$ molecules at a wavelength of 1240 nm and optical absorption based on OH groups at a wavelength of 1400 nm to be suppressed. Meanwhile, when the optical fiber after drawing is exposed to a deuterium ($D_2$) atmosphere, $D_2$ molecules are spread into glass. Then, absorption loss by the OD groups generated in the cross-reaction with the structural defects in glass occurs on the longer wavelength side than the wavelength band of 1550 nm. At the same time, absorption loss by free $D_2$ molecules themselves occurs in the vicinity of wavelength of 1420 nm. Then, though absorption loss by these $D_2$ molecules is small, it will increase apparent transmission loss of the optical fiber.

This will cause the following problems. First, as described above, absorption of the OH groups occurs in at a wavelength band of 1400 nm. Therefore, although the problem of absorption due to the OH groups in the wavelength band of 1400 nm should have already been solved by deuterium processing (hereinafter referred to as "$D_2$ processing"), the observer may judge that OH groups exist in the optical fiber because of an increase in the transmission loss observed even after $D_2$ exposing.

As a result, further $D_2$ processing may be continued using extremely expensive $D_2$. This means that although OD groups are actually generated in all structural defects due to $D_2$ processing, the above described phenomenon of an increase in transmission loss based on the absorption loss of $D_2$ molecules is misidentified as being based on OH group absorption due to the presence of the OH groups. This is because no standard for defining the appropriate time point at which $D_2$ processing ends has been established yet.

Therefore, a method of manufacturing an optical fiber should be provided which will solve the above described problem and define an appropriate time point at which $D_2$ processing ends based on new knowledge about the behavior of absorption due to $D_2$ molecules after $D_2$ processing.

The present invention provides a method of manufacturing an optical fiber including a step of carrying out deuterium processing on an optical fiber after drawing, characterized by having a time point at which the difference between 1) the difference between the average transmission loss at the wavelength of 1383 nm and the average transmission loss at the wavelength of 1420 nm of the optical fiber before deuterium processing, and 2) the difference between the average transmission loss at the wavelength of 1383 nm and the average transmission loss at the wavelength of 1420 nm of the optical fiber after deuterium processing is 0.01 dB/km or more.

More specifically, the present invention provides a method of manufacturing an optical fiber which provides a time interval of 48 hours or more from the time point at which the deuterium processing starts to the time point at which the measurement of average transmission loss for the optical fiber is taken, at 25° C.

In the following explanations, the "wavelength band of 1400 nm" means a wavelength within a wavelength range of 1335 to 1435 nm and the "wavelength band of 1550 nm" means a wavelength within a wavelength range of 1500 to 1600 nm. Furthermore, D2 processing refers to exposing of the optical fiber to a D2 atmosphere which has a higher concentration than that in the ordinary atmosphere.

Figure 7:
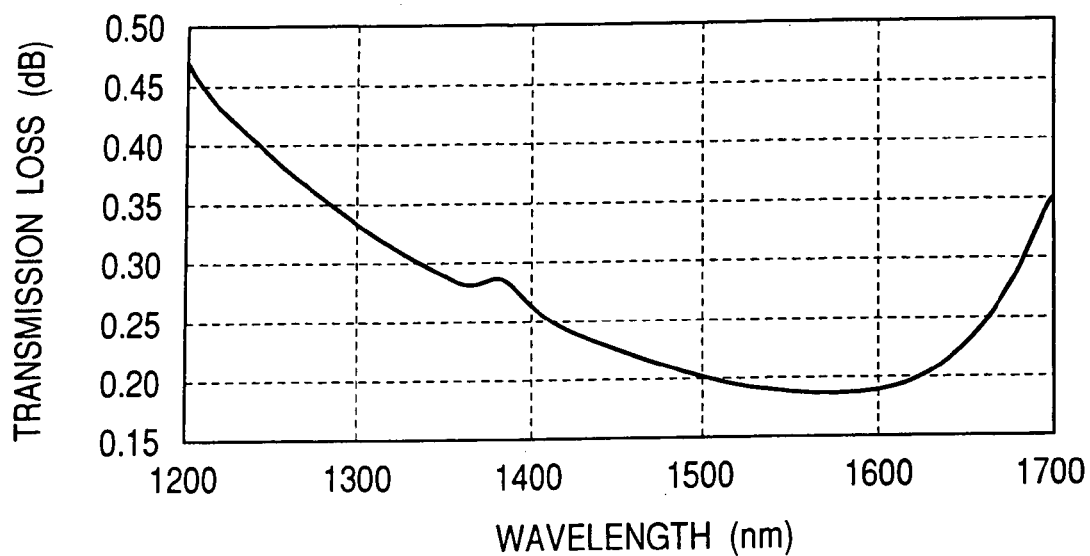
FIG. 7 is an example of a transmission loss spectrum of an optical fiber with drawing and with an extremely small amount of OH groups.

One example of an optical fiber transmission loss spectral diagram obtained by drawing the optical fiber preform manufactured using a usual method is shown in FIG. 7.

In this spectral diagram, the peak appearing in the vicinity of a wavelength of 1383 nm is transmission loss caused by OH groups and this optical fiber is ready for optical transmission in both the wavelength band of 1400 nm and wavelength band of 1550 nm.

Figure 8:
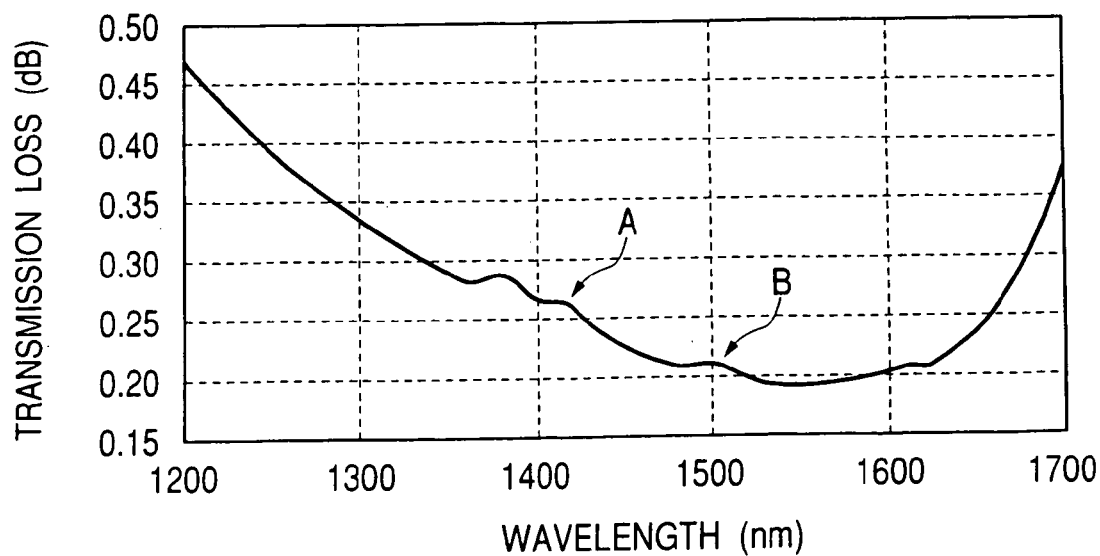
FIG. 8 is a is an example of a transmission loss spectrum when $D_2$ processing is applied to an optical fiber.

Then, the above described optical fiber is subjected to D2 processing for 72 hours after the commencement of D2 and a transmission loss spectral diagram of the exposed optical fiber is shown in FIG. 8.

The D2 processing is carried out in such a way that the optical fiber to be processed is housed in a sealed container of N2, for example, containing D2 of a predetermined concentration for a desired time.

As is apparent from FIG. 8, new transmission loss (A) appears in the vicinity of wavelength of 1420 nm and another new transmission loss (B) also appears in the vicinity of wavelength of 1500 nm. The latter is due to the generation of absorption loss by OD groups made up of deuterium atoms D coupled with structural defects in the optical fiber before the D2 processing.

Meanwhile, the former is due to an increase of loss caused by optical absorption by the D2 molecules themselves spreading to the optical fiber.

Thus, the present inventors measured transmission loss (A) over time at a wavelength of 1420 nm after the commencement of D2 processing, subtracted transmission loss before the D2 processing from the measured values at various time points and examined the relationship between the amount of variation of transmission loss and D2 processing time. The result is shown in FIG. 9.

Figure 9:
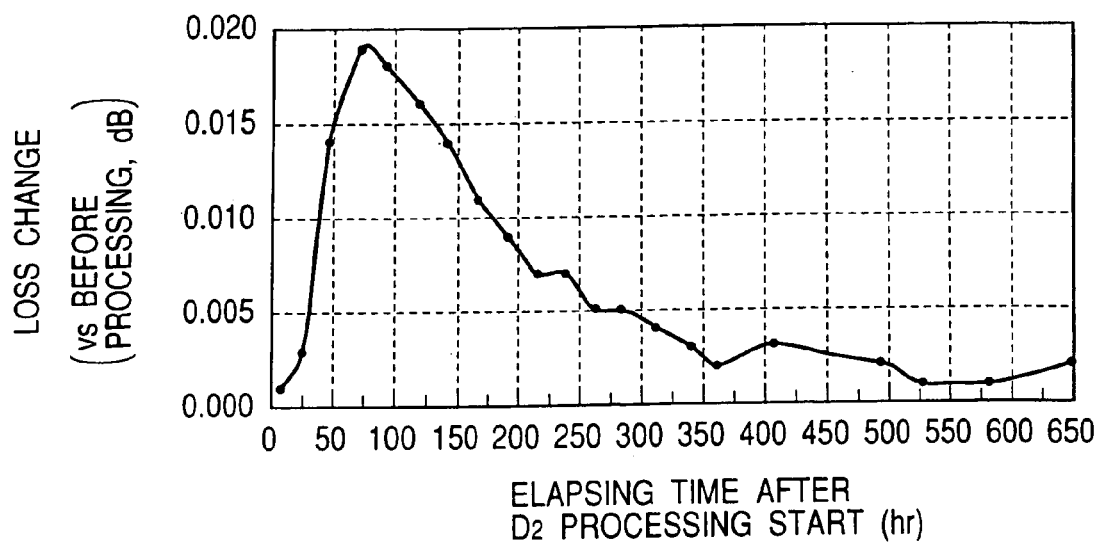
FIG. 9 is a graph showing a relationship between a transmission loss variation and $D_2$ processing time after $D_2$ processing is started.

As is apparent from FIG. 9, the moment the $D_2$ processing is started, transmission loss increases drastically compared to the value before the $D_2$ processing and reaches a maximum when a processing time of 72 hours has elapsed. From then on the transmission loss (A) decreases gradually.

From this new knowledge, the following points can be considered:

(1) The moment the $D_2$ processing is started, $D_2$ molecules start to spread into the optical fiber until they are saturated. For that reason, the absorption loss by $D_2$ molecules increases compared to the state before the $D_2$ processing and the transmission loss of the optical fiber increases drastically.
(2) Then, from the saturation state on, some portions of $D_2$ cross-react with structural defects and are coupled as OD groups sequentially, and therefore the amount of $D_2$ molecules in the optical fiber decreases sequentially and the absorption loss also decreases accordingly. On the contrary, the transmission loss increases with the absorption loss of OD groups.
(3) Then, after all structural defects have become OD groups, the residual $D_2$ molecules have no counterparts of reaction and therefore they escape out of the optical fiber. This escaping behavior is considered to have a balancing relationship with the spreading behavior from outside to inside of the optical fiber.
(4) Therefore, when a certain time elapses from the $D_2$ processing, at a certain time point at which the transmission loss of the $D_2$-processed optical fiber turns to a decrease, the structural defects have already completed the coupling with the OD groups, and therefore that time point can be regarded as the time point at which the $D_2$ processing has ended.

An improved method of manufacturing an optical fiber has been developed based on the above described new knowledge and considerations.

More specifically, from before to after the $D_2$ processing, the average transmission loss "a" (unit: dB/km) at a wavelength of 1383 nm is measured and at the same time the average transmission loss "b" (unit: dB/km) at a wavelength of 1420 nm is measured and the time point at which the difference of "a–b" from before to after the $D_2$ processing falls below 0.004 dB/km is regarded as the time point at which the $D_2$ processing ends.

Here, the wavelength of 1383 nm is selected because this wavelength is the wavelength indicating an absorption peak due to OH groups and the loss is hardly changed due to influences of the $D_2$ processing. The wavelength of 1420 nm is selected because it is possible to check from the loss change whether $D_2$ molecules have reached the core or not. Furthermore, the "a–b" value is set to 0.01 dB/km or below because it is necessary to confirm that $D_2$ have securely entered the core.

More specifically, by leaving the fiber at temperature 25° C. for 48 hours or more after the $D_2$ processing is started, the above "a–b" value can be set to 0.01 dB/km or more.

The optical fiber satisfying the above described condition, when the fiber length is 10 km or more, is an optical fiber whose cable cutoff wavelength at a length of 22 m is 1300 nm or below.

When the average transmission loss of the optical fiber after the $D_2$ processing is measured, it is preferable to leave the optical fiber in an atmosphere whose concentration is lower than the maximum concentration of $D_2$ during the $D_2$ processing for 300 hours or more. This is because the balancing relationship between the escaping and spreading of the aforementioned $D_2$ molecules is collapsed toward the escape side and $D_2$ molecules escape to the outside, and the absorption loss caused by free $D_2$ molecules in the optical fiber practically disappears.

As is apparent from the above described explanation, the present invention allows the time point at which the $D_2$ processing completes to be appropriately determined. Then, OH group absorption is also suppressed in a wide wavelength range of 1400 to 1550 nm and it is possible to manufacture an optical fiber usable for CWDM transmission.

Furthermore, when the average transmission loss of the optical fiber after the $D_2$ processing is measured, it is also possible to discern whether the average transmission loss increase is caused due to the absorption loss of $D_2$ molecules or other factors such as bending loss, etc.

Another problem is that even when an optical fiber is manufactured using high purity silica, only OH groups of on the order of 0.1 ppm normally exist in the optical fiber but there is a variation over time in the generation of OH groups.

That is, after drawing, even if the optical fiber with fewer OH groups is laid and actually used at a temperature of ordinary environment, the optical fiber exposed to a hydrogen outside at an ambient temperature, the hydrogen spreads into the optical fiber and forms OH groups and transmission loss in the wavelength range of 1300 nm to 1600 nm, particularly 1380 nm to 1600 nm, is known to increase over time. The variation over time of transmission loss caused by the presence of this hydrogen is normally called "hydrogen aging loss."

Influences of such hydrogen spreading are even observed through the cladding when optical fibers are accommodated into a telecommunication cable. This hydrogen spreading is also observed even when the fiber is exposed to an atmosphere containing a very small quantity of hydrogen on the order of 0.01% at an ordinary temperature and the loss of, for example, 0.02 dB/km to 0.12 dB/km is observed at a wavelength of 1383 nm.

Meanwhile, hydrogen is believed to be generated by a corrosion phenomenon due to heterogeneous metal which exists in the optical cable under an ordinary humidity or by heated silicon resin which makes up the coating. In the case of the optical fiber laid in the seawater or in the atmosphere, there is a problem that it has particularly large "hydrogen aging loss".

With respect to these problems, in the Japanese Published Patent Application No. 2002-148450, there is a proposal of $D_2$ processing whereby prior to its actual use, the optical fiber is exposed to a deuterium ($D_2$) atmosphere and then left standing in the atmosphere (e.g., see Japanese Published Patent Application No. 2002-148450).

This method is intended to eliminate causes for generation of OH groups in actual use by letting $D_2$ react with structural defects and OH groups which exist in the optical fiber after drawing and then leaving them standing for a predetermined time and thereby prevent transmission loss increase due to the generation of OH groups.

However, in the case of the $D_2$ processing described in the above described patent document, the problem is that the $D_2$ processing time is very long and the time during which $D_2$ molecules which have been spread into the optical fiber through $D_2$ processing and remain without reacting with OH groups are left standing so as to escape out of the optical fiber is also very long. Thus, the above described prior art results in low production efficiency in actual industrial production and cannot be necessarily considered as a satisfactory method in practicality.

For this reason, it is required to provide a method of manufacturing an optical fiber which solves the above described problems in the conventional $D_2$ processing, carries out $D_2$ processing quickly and efficiently and secures long-term reliability of the transmission characteristics.

In order to attain the above described object, the present invention provides a method of manufacturing an optical fiber characterized in that an optical fiber after being drawn and wound around a bobbin is immediately exposed to a gas atmosphere containing a deuterium gas and then rewound around another bobbin while applying tensile tension thereto before the deuterium gas in the optical fiber is fully degassed.

In that case, the tensile tension preferably corresponds to 0.5 to 2% in terms of an elongation value of the optical fiber and when the optical fiber is rewound, the optical fiber is preferably cut and divided into lengths in the longitudinal direction.

In an example of implementation of the method of the present invention, an optical fiber preform is drawn using a normal method and coated, the optical fiber is wound around a bobbin and immediately subjected to $D_2$ processing. More specifically, this example is implemented in such a way that the bobbin immediately after winding the optical fiber is housed in a sealed container, a gas containing $D_2$ is sealed into the container and left as is for a predetermined time.

As the ambient gas, for example, a mixed gas of air or inert gas (He, Ar, $N_2$, etc.) with $D_2$ is used and in that case, it is preferably a gas containing 0.01 to 100% $D_2$. The mixed gas containing almost 100% $D_2$ can suppress an increase in transmission loss even through short-time processing and is preferable in terms of high production efficiency.

The processing time less than 1 hour cannot allow the effect of the $D_2$ processing to be demonstrated fully and the effect reaches saturation even after 10 hours and reduces the production efficiency needlessly, and therefore the processing time is preferably 1 to 10 hours. It is more preferably around 2 hours.

When the temperature during the $D_2$ processing is too low, the reaction of $D_2$ processing becomes slower, whereas when the temperature is too high, the processing time may be shortened but the coating may be deteriorated, and therefore the temperature during the processing is preferably controlled to within the range of 25±3° C.

After the $D_2$ processing, the processed optical fiber is rewound around another bobbin immediately. At this time, tensile tension should be applied to the optical fiber.

That is, a great feature of the present invention is that it is possible to omit the step of leaving the fiber as it is for a long time after $D_2$ processing for degassing the $D_2$ molecules as in the case of the conventional art.

This rewinding can be executed not only in an air-conditioned atmosphere but also in a nitrogen containing atmosphere.

Then, when tensile tension is applied to the optical fiber, the tension is also applied to the coating and the temperature of the optical fiber may increase a little by flexion and friction energy of the coating. Furthermore, the tension is also applied to the core of the optical fiber. Therefore since the $D_2$ concentration on the surface of the core of the optical fiber becomes zero or very close to zero, the residual $D_2$ molecules inside the core is likely to escape to the outside, which shortens the time required for degassing.

The tensile tension applied at this time is set to a level such that an elongation of the optical fiber is 0.5 to 2.5%.

This is because in the case of the application of tension corresponding to an elongation less than 0.5%, the above described effect cannot be obtained, while in the case of the application of tension corresponding to an elongation greater than 2.5%, the coating may be damaged. Furthermore, during this rewinding, cutting and dividing the optical fiber into a predetermined length eliminates the need for providing an additional cutting/dividing step, which is therefore efficient.

Figure 10:
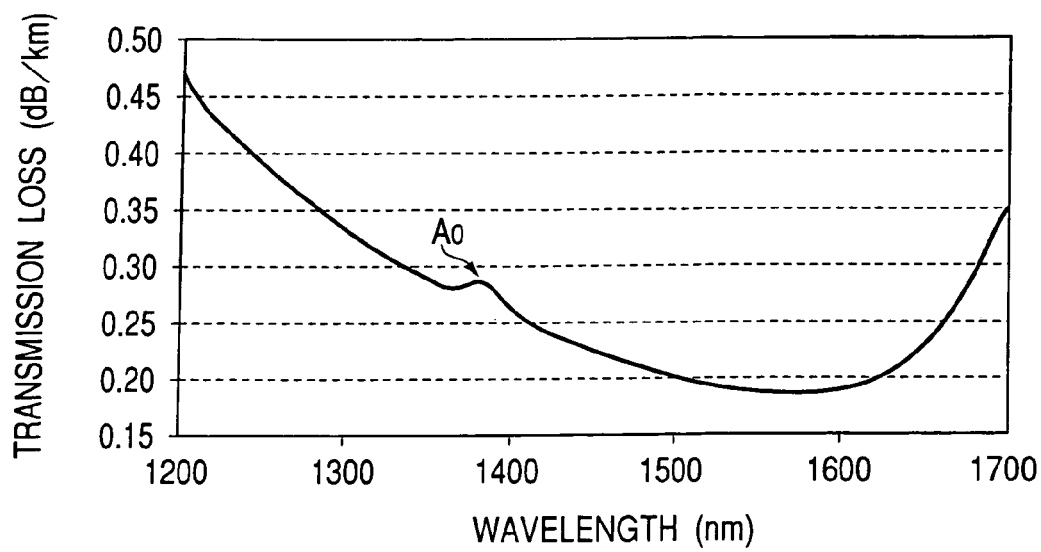
FIG. 10 illustrates a transmission loss spectrum of an optical fiber before $D_2$ processing.

An optical fiber preform was drawn and an optical fiber was manufactured using a conventional method and wound around a bobbin. One example of a transmission loss spectral diagram of this optical fiber is shown in FIG. 10. In FIG. 10, a peak A0 appearing in the vicinity of wavelength of 1380 nm is a transmission loss caused by OH groups.

Figure 11:
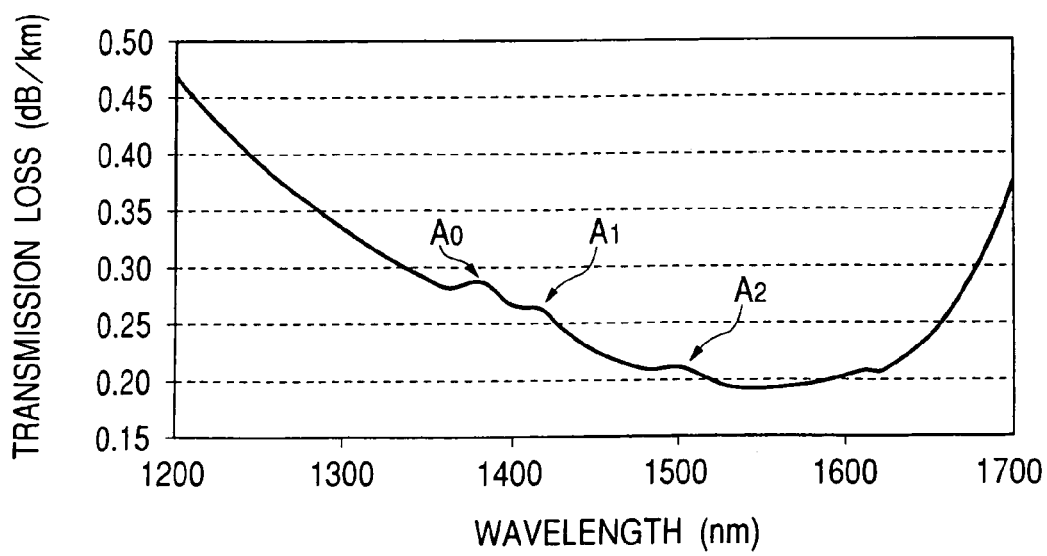
FIG. 11 illustrates a transmission loss spectrum of an optical fiber after $D_2$ processing.

Then, the bobbin was placed in a sealed container and a gas of $D_2$ 100% and $N_2$ 0% was sealed therein and left standing at a temperature of 25° C. for two hours and $D_2$ processing was performed. After the $D_2$ processing under the above described condition, the optical fiber was left standing for 72 hours and its transmission loss was measured. The result is shown in FIG. 11. As is apparent from the transmission loss spectral diagram in FIG. 11, a new peak A1 appears in the vicinity of wavelength of 1420 nm and a new broad peak A2 also appears in the vicinity of wavelength of 1500 nm. The former A1 is an increase of loss caused by absorption by $D_2$ molecules themselves spread in the optical fiber and the latter A2 is due to absorption loss due to OD groups formed by coupling structural defects with deuterium atoms D before $D_2$ processing.

Then, the optical fiber around the bobbin was rewound around another bobbin in the atmosphere. At this time, tensile tension was applied to the optical fiber so that its elongation reached 1.1% and cut and separated every 25.26 km. Then, transmission loss at the wavelength of 1420 nm after $D_2$ processing was measured over time, the transmission loss before the $D_2$ processing (value at 1420 nm in FIG. 10) was subtracted from the measured value at that time point, a relationship between the amount of variation and elapsed time after the $D_2$ processing was examined and expressed with -●-.

Furthermore, for comparison, the optical fiber after the $D_2$ processing was left as it is in the atmosphere without being rewound around another bobbin and the relationship between the amount of variation of transmission loss and elapsed time after the $D_2$ processing was examined in that case, too. The result was expressed with -×-.

Figure 12:
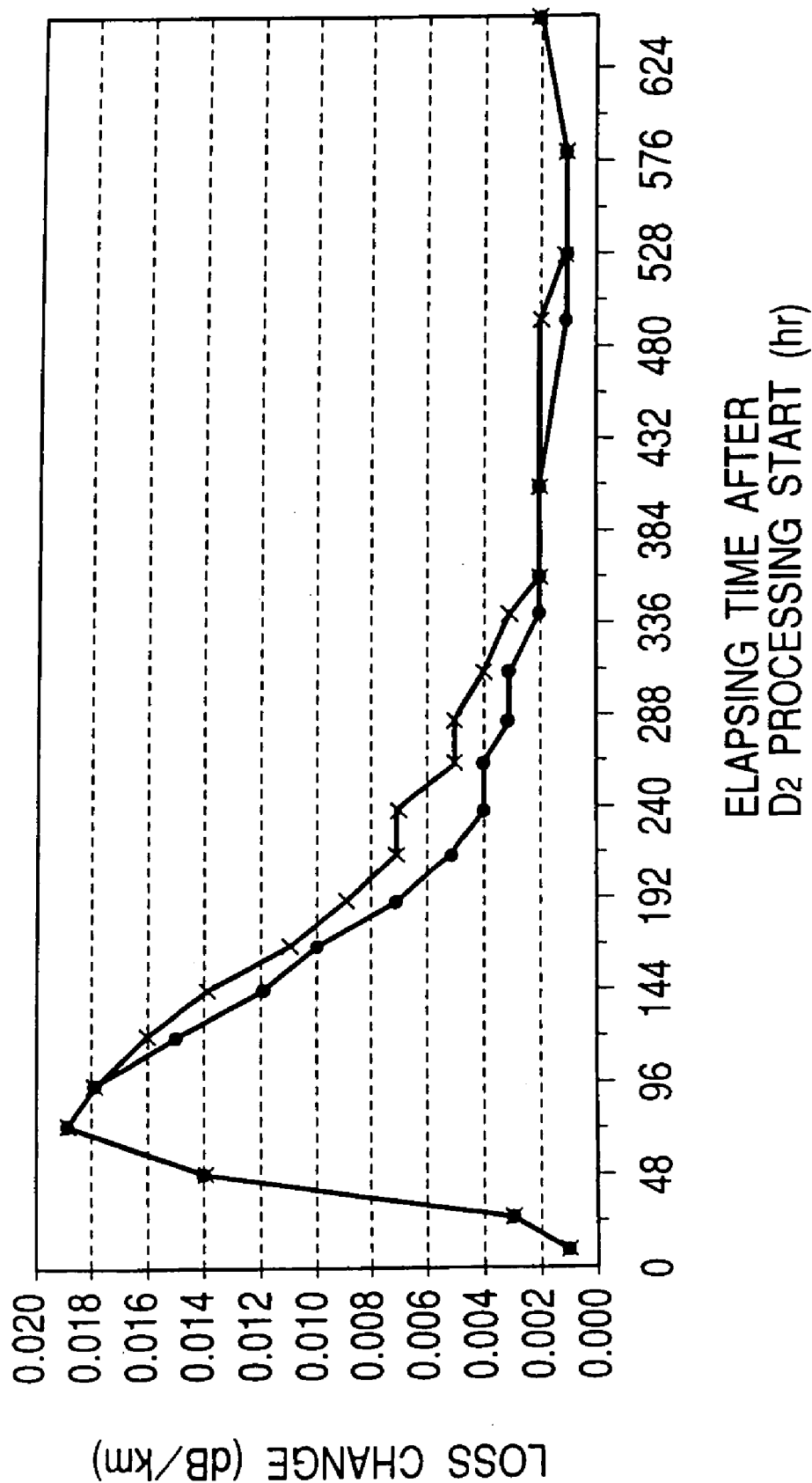
FIG. 12 is a graph showing a relationship between a transmission loss difference at a wavelength of 1420 nm from before to after $D_2$ processing and elapsed time after the $D_2$ processing is started.
Figure 13:
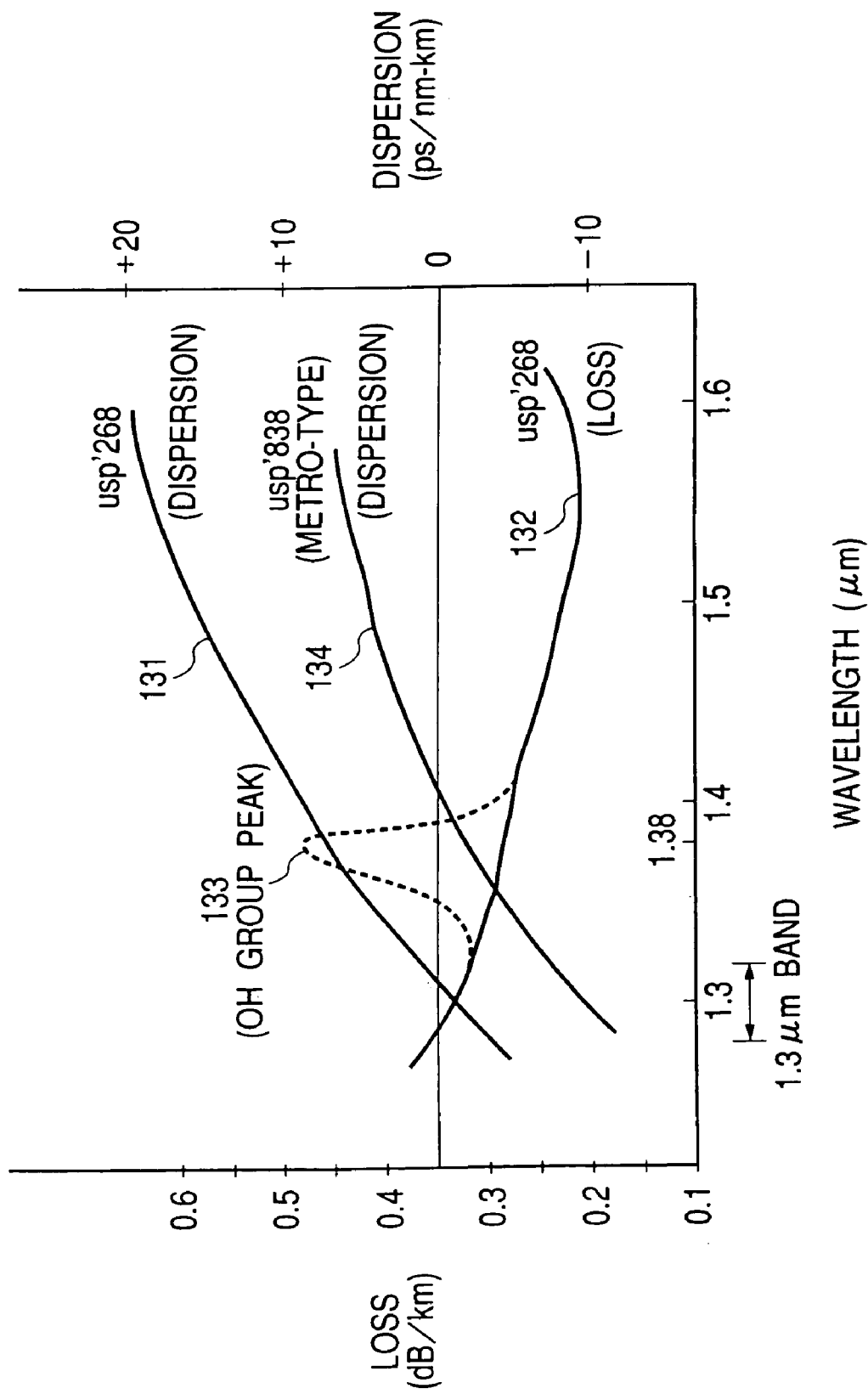
FIG. 13 illustrates a dispersion characteristic and transmission loss characteristic of a conventional optical fiber.

As is apparent from FIG. 12, it is appreciated that with the optical fiber manufactured according to the method in the example, free $D_2$ molecules showing absorption loss in the vicinity of wavelength of 1420 nm escaped in a shorter time than the optical fiber manufactured according to the method in the comparative example.

As is apparent from the above described explanation, when an attempt is made to manufacture an optical fiber whose "hydrogen aging loss" is reduced due to $D_2$ processing, this object can be achieved without leaving the fiber as it is for a long time after the $D_2$ processing as in the case of the conventional art. This is the effect brought about by the present invention by cutting, dividing and rewinding the fiber while applying tensile tension immediately after the $D_2$ processing.

Therefore, according to the method of the present invention, it is possible to produce an optical fiber which does not increase transmission loss in a short time and eliminate the need for a step of leaving the fiber as it is for a long time, and thereby eliminate the need for retaining many bobbins for rewinding the cut/divided optical fibers for a long time, which will greatly contribute to practical use of $D_2$ processing.

The invention claim is:

1. A piece of optical fiber having a length of twenty-five kilometers or more, an average transmission loss at a wavelength of 1383 nanometer (nm) over the entire length of the piece less than an average transmission loss at a wavelength of 1310 nm over the entire length of the piece, and a zero dispersion wavelength in the vicinity of 1310 nm, wherein the maximum value of transmission loss at each of the wavelengths of 1310 nm and 1550 nm in any 1 km section taken along the optical fiber does not exceed an average transmission loss at said each of the wavelengths of 1310 nm and 1550 nm over the whole length of the piece by 0.03 dB/km or more, characterized in that the minimum value of transmission loss at the wavelength of 1383 nm in any 1 km section taken along the optical fiber does not exceed an average transmission loss at the wavelength of 1383 nm over the entire length of the piece by 0.03 dB/km or more.

2. The optical fiber according to claim 1, wherein the maximum value of transmission loss at the wavelength of 1383 nm in any 1 km section does not exceed the average transmission loss at the wavelength of 1383 by 0.01 dB/km or more.

3. The optical fiber according to claim 1, wherein a cable cutoff wavelength at a length of 22 meter (m) is less than 1380 nm.

4. The optical fiber according to claim 1, wherein the average transmission loss at the wavelength of 1383 nm is less than the transmission loss at the wavelength of 1310 nm after hydrogen ageing.

5. An optical fiber having an MF'D of 8 micrometer (μm) or more at 1310 nm, a zero dispersion wavelength out of a wavelength range of 1280 to 1324 nm, a dispersion in said wavelength range of 0.1 to 8.0 picosecond/nanometer/kilometer (ps/nm/km) in absolute value, a dispersion slope of 0.1 picosecond/nanometer$^2$/kilometer (ps/nm$^2$/km) or less, a cutoff wavelength of 1270 nm or less determined according to a 22 m method not more than 1270 nm and an average transmission loss at the wavelength of 1310 nm of 0.4 dB/km or less.

6. The optical fiber according to claim 5, wherein said optical fiber has MFD at 1310 nm of 9.5 μm or less.

7. The optical fiber according to claim 5, wherein a zero dispersion wavelength exist within a wavelength range of 1325 nm to 1350 nm.

8. The optical fiber according to claim 5, wherein an MFD at 1310 nm is A (μm) and a cutoff wavelength determined according to a 2 m method is B (nm), with satisfying A×B≦11*1000.

9. The optical fiber according to claim 5, wherein an average transmission loss at the wavelength of 1383 nm is less than an average transmission loss at the wavelength of 1310 nm.

10. The optical fiber according to claim 9, wherein an increase in transmission loss at wavelength of 1383 nm after hydrogen ageing is 0.04 dB/km or less.

* * * * *